Aug. 3, 1965  J. H. MORSE ETAL  3,199,049
OPTICAL MASER SYSTEM FOR OBTAINING SHORT
PULSES OF EMITTED ENERGY
Filed Aug. 18, 1961
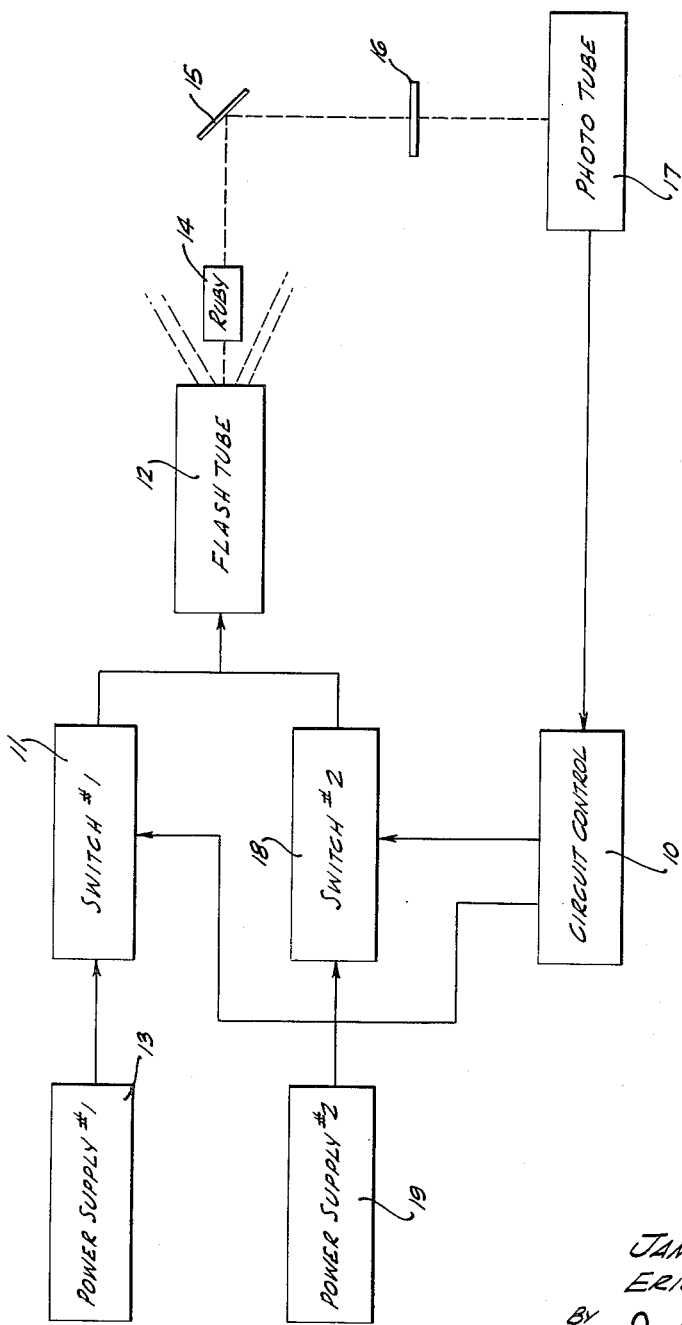
INVENTORS.
JAMES H. MORSE,
ERIC J. WOODBURY,
BY John M. Koch
ATTORNEY

United States Patent Office 3,199,049
Patented Aug. 3, 1965

3,199,049
OPTICAL MASER SYSTEM FOR OBTAINING
SHORT PULSES OF EMITTED ENERGY
James H. Morse, Malibu, and Eric J. Woodbury, Los Angeles, Calif., assignors to Hughes Aircraft Company, Culver City, Calif., a corporation of Delaware
Filed Aug. 18, 1961, Ser. No. 132,392
9 Claims. (Cl. 331—94.5)

This invention relates to the operation and control of a maser, or laser oscillator, and particularly to the control of light energy pulses emitted from an optical maser, or laser.

An optical maser generates an intense collimated beam of coherent light. In the typical high power optical maser this light beam normally assumes the form of a pulse which is several tens of microseconds in duration and which usually has an irregular, noise-like structure. Of the various techniques used to eliminate the noise-like time structure of the emitted pulse, cooling has been the most successful. However, when using prior art techniques, such as cooling, a long pulse in time having some noise-like characteristics still remains. Such a long pulse of emitted light is unsatisfactory for many purposes.

Accordingly, it is an important object of this invention to provide an optical maser system for obtaining short pulses of light energy relatively free of noise-like characteristics.

Additional objects will become apparent from the following description which is given primarily for purposes of illustration and not limitation.

Stated in general terms, the objects of this invention are attained by providing a system for operating an optical maser which involves controlling the output pulse of the maser by exiting the maser material to a level near the stimulated emission level, also referred to as the threshold level, at which coherent light emission is produced, and then exciting the maser material above the threshold, or stimulated emission level. The second excitation is effected after a short time interval following the point of completion of the first excitation step, which time interval is less than the relaxation time for the maser material. The second excitation step preferably is produced by the application of a flash of light energy with a time structure similar to that which is desired in the stimulated emission output pulse of the maser. The resulting output pulse thus can be made to have a high intensity and a short time of duration. When the pulse duration is of the same order of magnitude as that of a single pulse in the normal maser output, the resulting output pulse is substantially noise-free.

For example, when a single crystal of ruby in the form of a rod of maser material, prepared by methods known in the art by doping aluminum oxide with chromium oxide, is arranged so that it can absorb intense white light energy, the chromium atoms in the ruby rod are excited to a metastable quantum state. Normally this state decays to the ground state of the crystal by the emission of deep red fluorescent radiation. The decay time for the spontaneous radiation is of the order of a few milliseconds. By arranging the ruby maser material in an interferometer system, this decay can be stimulated so that an intense, coherent, collimated beam of monochromatic radiation of wavelength 6943 A. results. The resulting beam of radiation has a noise-like character and also is rather long in duration.

By the use of this invention a single pulse of short duration, of the order of a fraction of a microsecond, is obtained. The maser material is excited in the usual manner to the stimulated emission level. An initial burst of coherent emission is produced and the maser material then is in a quantum state just below the threshold level for stimulated emission. During time intervals short, compared to the spontaneous emission time interval of the maser material element, additional inputs of white light result in the production of additional coherent light output pulses. These additional output pulses have time characteristics similar to those of the additional white light inputs respectively. The method of the invention provides a system for introducing these additional white light inputs and producing the respective, single or periodic, controlled output pulses.

Such a system is useful for various purposes, including application to a ranging device. In previous ranging devices the data processing thereof has been greatly complicated by the noise-like character and/or the long duration of the coherent light pulse. By the use of the present invention these difficulties are overcome and the usual methods employed in standard ranging by radar can be employed.

An illustration of a particular system comprehended by the present invention is shown in the accompanying drawing. In operation, the control circuit 10 closes switch #1 at 11, which supplies a large amount of energy to the flash tube 12. This energy is of the order of a few hundred joules, and is supplied in a few hundred microseconds with the aid of power supply #1 at 13.

As soon as the output of coherent light from the ruby rod 14 of master material is detected, by means of the partially reflecting mirror 15, a filtering system indicated at 16, which removes the white light to a level below the coherent light wavelength, and a phototube 17, control circuit 10 opens switch #1 at 11. After a period of time long enough to allow the light energy from flash tube 12 to die out, and to allow other undesirable effects to cease, such as for example, in a ranging system to allow the returned echoes from the original burst of coherent light to die out, control circuit 10 closes the switch #2 at 18, which connects the power supply #2 at 19 to flash tube 12.

Power supply #2 at 19 and switch #2 at 18 are arranged so that they supply a very short pulse in time duration of energy to flash tube 12. Then, if the waiting time between the opening of switch #1 at 11 and the closing of switch #2 at 18 is small compared to the normal decay time of the metastable level in ruby rod 14 of maser material, the maser will still be in such a quantum state that the additional flash of white light from flash tube 12 will produce the emission of an additional flash of coherent light from ruby rod 14. The additional flash of coherent light, however, is in the form of a single, intense pulse of short duration and relatively free of noise-like characteristics.

It will be understood that, in principle, this type of operation also can be obtained by using, instead of two power supplies 13 and 19, a single power supply controlled by a sensing device, such as phototube 17 shown in the drawing. In actual practice, however, the use of separate power supplies is better because of the radically different power requirements placed respectively on the two power supplies. The first power supply 13 is required to furnish a rather large amount of energy to cause the maser material 14 to be excited to the threshold condition, but it can supply this energy over a relatively long period of time. The second power supply 19 furnishes a much smaller amount of total energy, but is required to supply it at a very high power rate and with accurately controlled time characteristics.

Furthermore, the system illustrated in the drawing shows the use of a single flash tube 12. Under many conditions it is more desirable to use two flash tubes. The first flash tube is used for the initial charging or exciting flash, and the second flash tube is used for the accurately controlled, or pulse producing, flash.

In addition, the system shown in the drawing requires that the first light flash be sufficiently energetic to cause actual maser action that can be detected by the phototube 17. Similar results can be obtained by making previous measurements on the threshold energy for the maser element used and supplying just slightly less than this amount of energy to the maser element in the first flash, hence leaving it just below the threshold for maser action. Instead of a phototube 17, other suitable sensing means is employed to detect or indicate the excitation state or degree of excitation of the maser material. In general, however, the system shown in the drawing is superior since it has certain self-regulatory features and does not require precise knowledge of the characteristics of the maser material used.

In the description given above, of a specific embodiment of the invention, a ruby rod was employed as the maser material. It will be understood, however, that any maser material which has a characteristic threshold, or stimulated emission level of energy can be employed in the method or system of the invention.

What is claimed is:

1. A method of operating an optical maser for controlling the output pulse thereof which comprises exciting the maser material to a level below the stimulated emission level with a relatively large amount of pumping energy supplied over a relatively long time, sensing the emission of coherent light from the maser material, and then exciting the maser material to the level for stimulated emission with a relatively small amount of pumping energy supplied over a relatively short time.

2. A method of operating an optical maser for controlling the output pulse thereof which comprises exciting the maser material with a relatively large amount of pumping energy supplied over a relatively long time, to a level below the threshold level at which a coherent light pulse of stimulated emission is produced, sensing the emission of coherent light from the maser material, and then exciting the maser material to the threshold level for emission of a coherent light output pulse with a relatively small amount of pumping energy supplied over a relatively short time.

3. A method of operating an optical maser for controlling the output pulse thereof which comprises exciting the maser material to a level below the threshold level at which a coherent light pulse of stimulated emission is produced, sensing the emission of coherent light from the maser material, and then after an interval of time less than the relaxation time for the maser material, exciting the maser material to stimulated emission with a flash of light energy having a time structure similar to that desired in the stimulated emisison output pulse of the maser.

4. A system for operating an optical maser for controlling the output pulse thereof which comprises a body of optical maser material, maser material excitation means operatively associated with the maser material, power supply means operatively connected to the excitation means for energizing the excitation means, sensing means for detecting the excitation state of the maser material by sensing radiation emitted therefrom, and switching means cooperatively connected to the sensing means the excitation means and the power supply means for controlling the excitation state of the maser material by controlling the connection of the power supply means to the excitation means.

5. A system for operating an optical maser for controlling the output pulse thereof which comprises a solid body of optical maser material, flash tube means operatively associated with the maser material for excitation thereof, power supply means operatively connected to the flash tube means for energizing the same, sensing means for detecting the excitation state of the maser material by sensing radiation emitted therefrom, and switching means cooperatively connected to the sensing means the flash tube means and the power supply means for controlling the excitation state of the maser material by controlling the connection of the power supply means to the flash tube means.

6. A system for operating an optical maser for controlling the output pulse thereof which comprises a solid body of optical maser material, a first flash tube means operatively associated with the maser material for excitation thereof to a level below the threshold level, a second flash tube means operatively associated with the maser material for excitation thereof to a level above its threshold level, power supply means operatively connected to the flash tube means for energizing the same, sensing means for detecting the excitation state of the maser material by sensing radiation emitted therefrom, and switching means cooperatively connected to the sensing means the power supply means and the flash tube means for controlling the excitation state of the maser material by controlling the connection of the power supply means to the flash tube means.

7. A system for operating an optical maser for controlling the output pulse thereof which comprises a solid body of optical maser material, flash tube means operatively associated with the maser material for excitation thereof, first power supply means operatively connected to the flash tube means for energizing the same and exciting the maser material to a level below the threshold level, second power supply means operatively connected to the flash tube means for energizing the same and exciting the maser material to its threshold level, sensing means for detecting the excitation state of the maser material by sensing radiation emitted therefrom, and switching means cooperatively connected to the sensing means the flash tube means and the power supply means for controlling the excitation state of the maser material by controlling the connection of the power supply means to the flash tube means.

8. A system according to claim 7, wherein the maser material is a ruby rod.

9. A system according to claim 7, wherein the sensing means is a phototube sensing means.

References Cited by the Examiner

Kaiser et al.: "Fluorescence and Optical Maser Effects in $CaF_2$: $Sm^{++}$", Physical Review, vol. 123, No. 3, August 1, 1961, pp. 756–776.

Maiman: "Stimulated Optical Radiation in Ruby," Nature, vol. 187, No. 4736, pages 493, 494, August 6, 1960.

JEWELL H. PEDERSEN, *Primary Examiner.*